(12) United States Patent
Ringewald et al.

(10) Patent No.: US 8,669,457 B2
(45) Date of Patent: Mar. 11, 2014

(54) DYNAMIC GENERATION OF PLAYLISTS

(75) Inventors: Erich Lawrence Ringewald, Belvedere, CA (US); Sam Heyworth, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 979 days.

(21) Appl. No.: 12/341,169

(22) Filed: Dec. 22, 2008

(65) Prior Publication Data

US 2010/0162115 A1   Jun. 24, 2010

(51) Int. Cl.
    *G10H 1/36*   (2006.01)
(52) U.S. Cl.
    USPC ................................. 84/615; 84/618; 84/634
(58) Field of Classification Search
    USPC ............................................................. 84/615
    See application file for complete search history.

(56) References Cited

U.S. PATENT DOCUMENTS

| | | | |
|---|---|---|---|
| 5,864,868 A | 1/1999 | Contois | |
| 6,266,649 B1 * | 7/2001 | Linden et al. | 705/7.29 |
| 6,317,722 B1 | 11/2001 | Jacobi | |
| 6,389,467 B1 | 5/2002 | Eyal | |
| 6,721,489 B1 | 4/2004 | Benyamin | |
| 6,721,741 B1 | 4/2004 | Eyal | |
| 6,728,729 B1 | 4/2004 | Jawa | |
| 6,731,312 B2 | 5/2004 | Robbin | |
| 6,865,546 B1 | 3/2005 | Song | |
| 7,133,924 B1 * | 11/2006 | Rosenberg et al. | 709/231 |
| 7,208,669 B2 * | 4/2007 | Wells et al. | 84/601 |
| 7,227,073 B2 | 6/2007 | Kim | |
| 7,283,429 B2 | 10/2007 | Suzuki | |
| 2003/0135513 A1 * | 7/2003 | Quinn et al. | 707/102 |
| 2004/0186733 A1 | 9/2004 | Loomis | |
| 2005/0038819 A1 * | 2/2005 | Hicken et al. | 707/104.1 |
| 2006/0143236 A1 * | 6/2006 | Wu | 707/104.1 |
| 2008/0126384 A1 * | 5/2008 | Toms et al. | 707/102 |
| 2009/0217804 A1 * | 9/2009 | Lu et al. | 84/602 |

* cited by examiner

*Primary Examiner* — Christopher Uhlir
(74) *Attorney, Agent, or Firm* — Novak Druce Connolly Bove + Quigg LLP

(57) ABSTRACT

A system can receive and/or otherwise access information about items of content (e.g., audio tracks, video tracks, images and/or other items), information about a playlist to be generated, information about the past behavior of the target entity for the playlist and/or information about the past behavior of other entities. Examples of information about the items of content include genre, artist, album, time period, etc. Examples of information about a playlist include tempo curve, event type, playlist duration, etc. Based on all or a subset of the above-described information, the system automatically generates a playlist that identifies items of content. The playlist is presented to the target entity so that the target entity can acquire the playlist and/or the items of content identified in the playlist. In some embodiments, the target entity is also provided with an opportunity to edit the playlist.

30 Claims, 12 Drawing Sheets

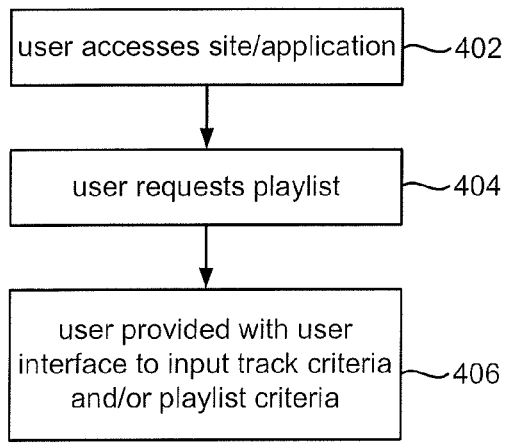
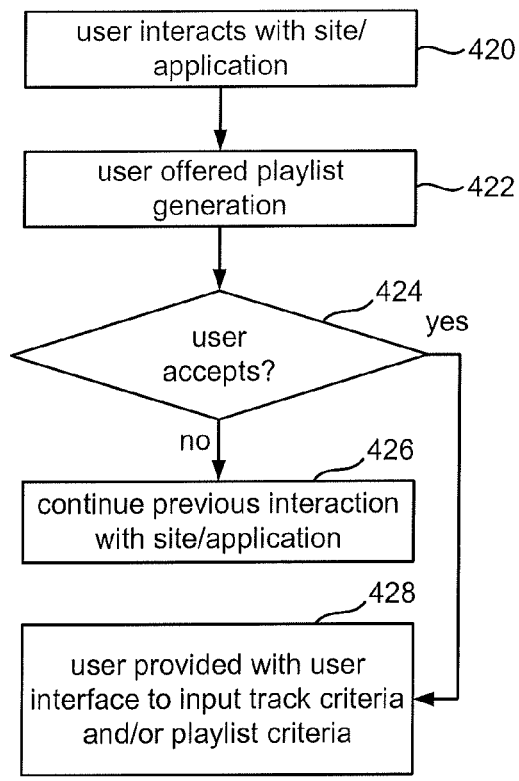
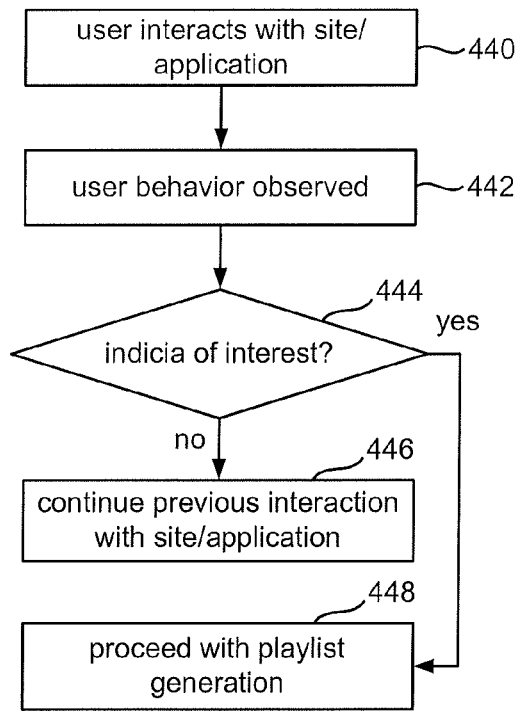

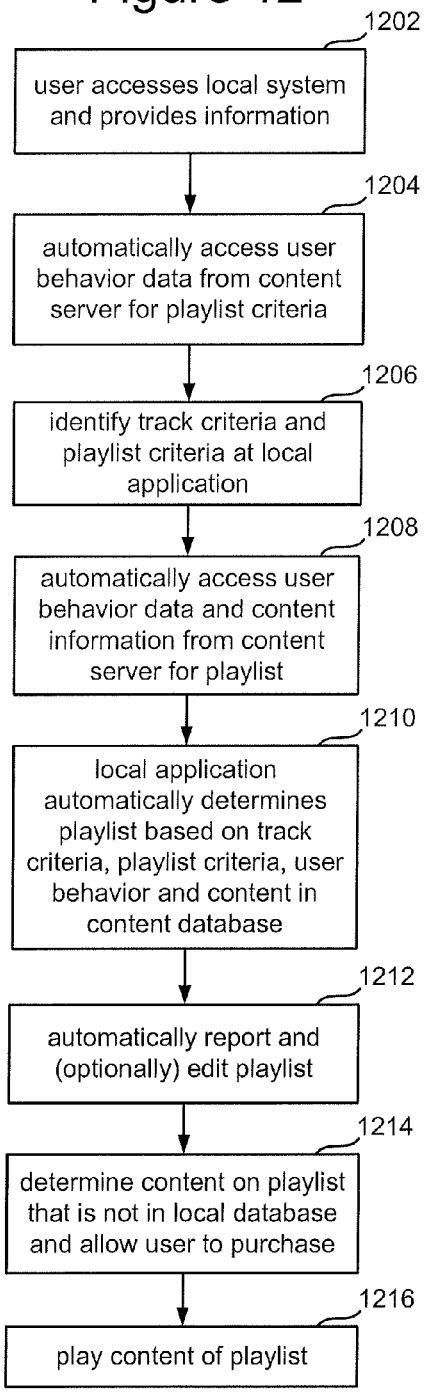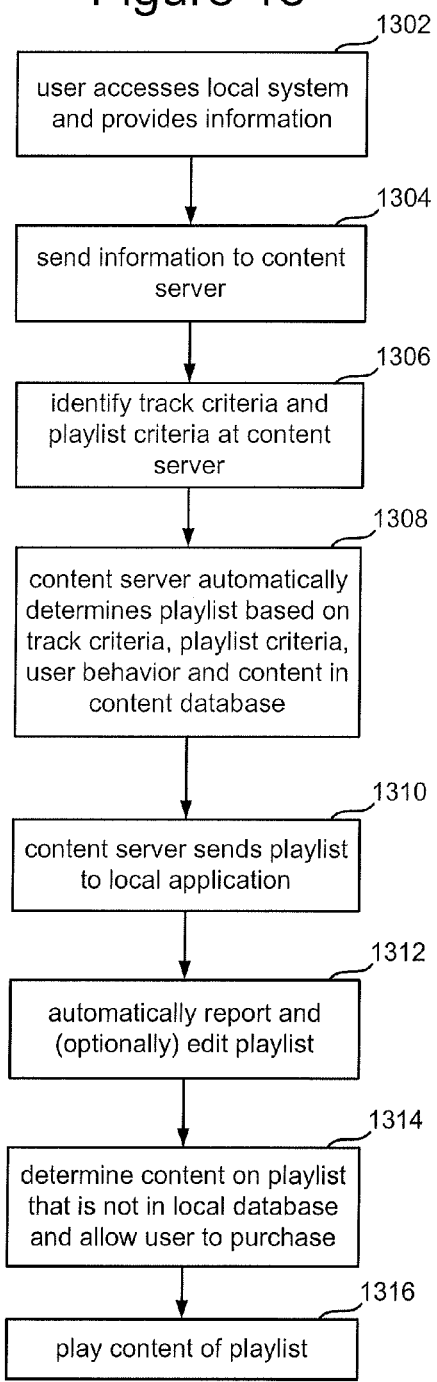

DYNAMIC GENERATION OF PLAYLISTS

BACKGROUND

Digital music has increased in popularity. For example, many people have personal digital music players, car stereos that can connect to personal digital music players, home stereos that can connect to personal digital music players, home stereos that's can play digital music and speakers connected to computers that can play digital music.

Many users of digital music have obtained and continue to obtain large amounts of music. For some users, the large amount of songs stored on their machines makes it difficult to select a subset of music to listen to during a particular event. To solve this problem, some music organizing applications have the ability to automatically generate playlists based on artist, genre, or album. However, the options for automatic playlist generation are very limited.

Users of digital music are also interested in obtaining additional music that is of interest to them. There are web sites that allow users to browse millions of songs for purchase. However, the number of choices is overwhelming and most users need guidance to find the appropriate music.

Similar issues apply to other types of content, such as video, still images, etc.

BRIEF DESCRIPTION OF THE DRAWINGS

The components in the drawings are not necessarily to scale relative to each other. Like reference numerals designate corresponding parts throughout the several views.

FIGS. 4A-C are flow charts describing embodiments of a process for acquiring information to generate a playlist.

FIG. 12 is a flow chart describing one embodiment of a process for dynamically and automatically generating playlists.

FIG. 13 is a flow chart describing one embodiment of a process for dynamically and automatically generating playlists.

DETAILED DESCRIPTION

A system for dynamically and automatically generating playlists is described herein. A playlist is a sequential list of items of content. The playlist is generated for a target user. The system can potentially receive and/or otherwise access information about the items of content, playlist to be generated, past behavior of the target user, and past behavior of other users. Examples of items of content include audio tracks, video tracks (with and without audio), and/or other items. Examples of information about the items of content include genre, artist, album, time period, etc. Examples of information about a playlist include tempo curve, event type, playlist duration, etc. Based on all or a subset of the above-described information, the system automatically generates a playlist that identifies items of content. The playlist is presented to the target user so that the target user can acquire the playlist and/or the items of content identified in the playlist. In some embodiments, the user is also provided with an opportunity to edit the playlist.

Figure 1:
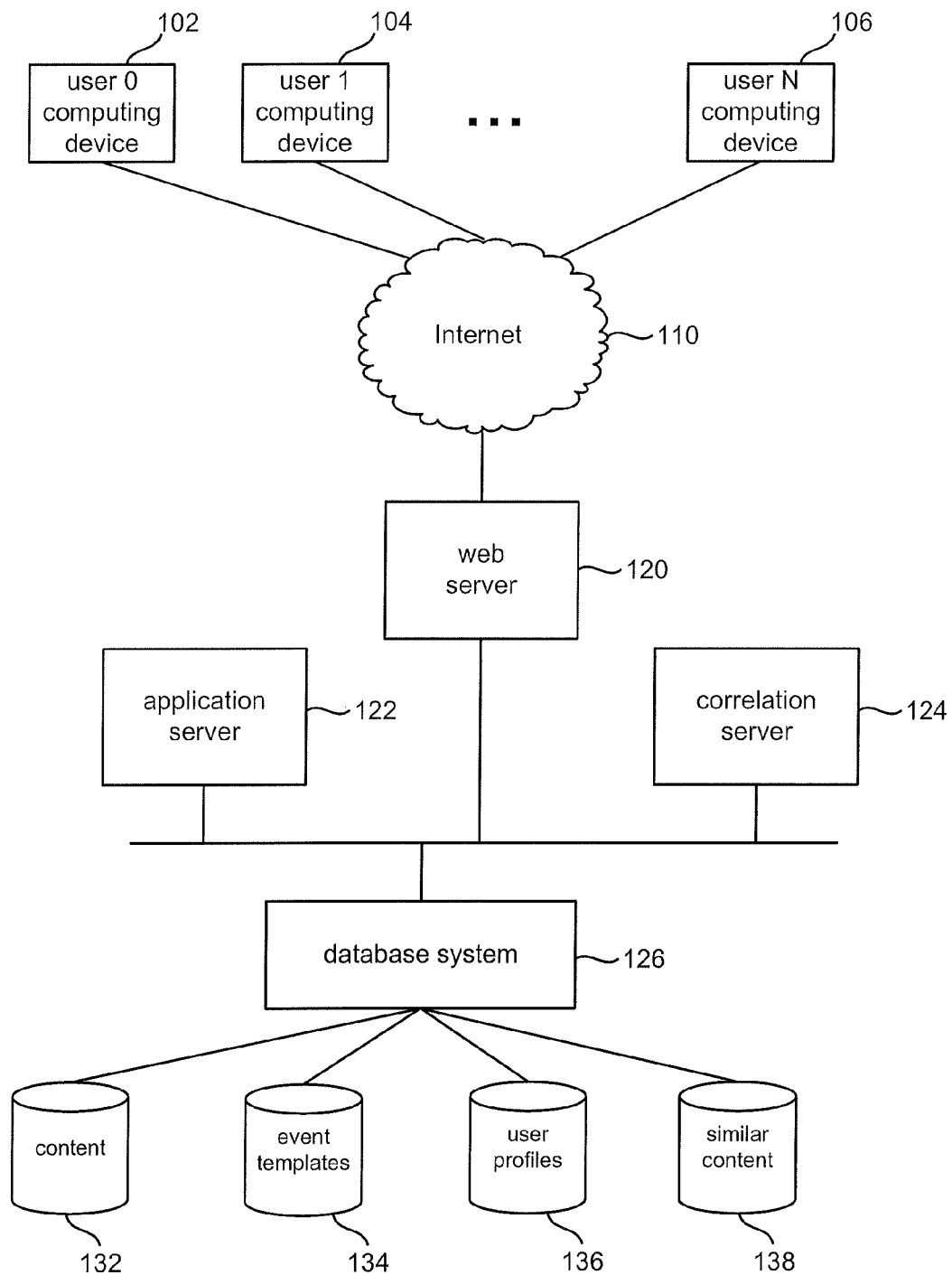
FIG. 1 is a block diagram of one embodiment of a system that can dynamically and automatically generate playlists.

FIG. 1 is a block diagram of one embodiment of a system that can dynamically and automatically generate playlists. In the discussion below, the examples of items of content include audio tracks and/or video tracks (with and without audio). Other types of content can also be used with the technology described herein. FIG. 1 shows a number of computing devices communicating via the Internet 110 or other network. For example, FIG. 1 shows user computing devices 102, 104, . . . , 106 for user 0, 1 . . . , N. Each of those user devices 102, 104, . . . , 106 can connect to the Internet 110 via any means known in the art. No particular networking technology is required for the technology described herein. User computing devices 102, 104, . . . , 106 can be desktop computers, notebook computers, personal digital assistants, telephones, smart appliances, or any other type of computing device. These user computing devices 102, 104, . . . , 106 communicate with web server 120 via Internet 110. In other embodiments, user computing devices communicate with web server 120 via other networks or other means for communication.

Web server 120 is a standard web server known in the art that can communicate using HTTP or other protocols. In one embodiment, web server 120 provides HTML content to user computing devices in order to implement one or more web sites. In other embodiments, web server 120 can communicate using other protocols and/or other programming languages, and can implement any one of various communication schemes known in the art. In one embodiment, web server 120 can include all of the logic necessary to perform the technology described herein. In other embodiments, web server 120 can communicate with other servers via a Local Area Network ("LAN"). For example, FIG. 1 shows web server 120 in communication with application server 122, correlation server 124 and database system 126 via a LAN.

Application server 122 includes one or more software applications that perform the business logic described herein. For example, web server 120 can be used to communicate with the user computing devices, while application server 122 will dynamically generate the playlists according to the methods described herein and based on the communication between the appropriate user computing devices and web server 120.

Database system 126 includes one or more database servers that manage one or more databases. In one embodiment, relational databases are used. In other embodiments, other data structures can also be used. The technology described herein is not limited to any one particular type of data structure and those of ordinary skill in the art can determine the most suitable data structure for the particular implementation considered. FIG. 1 shows database system 126 in communication with content data 132, event template data 134, user profiles data 136, and similar content data 138.

Content data 132 stores the various items of content. For example, in a system that is creating a playlist of songs, content database 130 will store music files. Any particular format is suitable for the technology described herein, including MP3, WAV, AAC, FLAC, and other formats. Many digital music formats include header information which identifies various track criteria. For example, MP3 files include ID3 tags that store track name, artist, album, genre and time periods. Other music formats can store the same header data as well as additional data. The technology described herein is not limited to any particular format and any particular set of track criteria. Similarly, in a system that is creating a playlist of videos, content database 132 will store video files such as MPEG-4, AVI, DIVX, M4V, MOV and other formats.

Event templates data 134 stores event templates. Event templates provide playlist criteria for various types of events. As described below, a user can identify the type of event for which the user is seeking a playlist. Based on that identified type of event, a playlist can be generated tailored to the particular event. Examples of event types include run, work out at gym, dance party, dinner party, office cocktail party, home cocktail party, reading, airplane trip, working, etc. Various other event types can also be used.

Each event type is associated with an event template which identifies playlist criteria such as tempo curve, playlist duration and one or more genres. Other criteria could also be included in the template. Playlist duration is the length of time it would take to play all of the content identified in the playlist. Tempo is the speed or pace of a given item of content. Tempo can be expressed by a tempo descriptor such as fast, medium, or slow. In other embodiments, more descriptors than fast, medium, or slow can be used. Tempo curve is a description of how the tempo changes while playing items of content on the playlist according to the order of sequence in the playlist. In one embodiment, the tempo curve is described by a tempo curve definition, which is an ordered series of tempo descriptors. Some examples of temp curve include: (1) fast-slow-medium-slow-fast; (2) slow-medium-fast; (3) slow-medium-fast-slow; etc. Depending on the particular embodiment, the number of changes in the tempo curve can be fixed or variable. In one embodiment, each tempo descriptor in the tempo curve definition applies to an equal amount of the duration of the playlist so that if there are X descriptors, each descriptor applies to 1/X of the duration of the playlist. For example, the tempo curve of slow-fast-medium-slow will apply each of the four descriptors for $\frac{1}{4}^{th}$ of the time. In other embodiments, the tempo curve definition can be a set of tupels, where each tupel includes a tempo descriptor (fast, medium, slow) and a time such that the times in each of the tupels have a sum equal to the entire duration of the playlist. Another embodiment includes a GUI with a slider bar representing the duration of the playlist and the ability to adjust tempo points along the slider. Various other formats of describing the tempo curve can also be used. Note that tempo curve, playlist duration and event type are examples of playlist criteria that apply to the playlist as a whole and are not particular to a single item of content.

The technology described herein uses behavior data to help pick items of content for a playlist. The system can consider the behavior of the user for which the playlist is being generated as well as the behavior of other entities. In one embodiment, a recommendation engine in correlation server 124 makes recommendations for a playlist being generated by application server 122. Given a listing of items of content that are thought to be of interest to the target user of the playlist, the recommendation engine can generate a list of additional items that are predicted to be of interest to that user. With appropriate filtering based on the criteria discussed herein, these recommended items of interest can be added to the playlist being generated. Correlation server 124 utilizes user profiles data 136 to identify items of content that are thought to be of interest to the user and similar content data 138 to generate the list of additional items that are predicted to be of interest to the user. More details will be discussed below.

User profiles data 136 stores account specific information and behavior data for users of the system. The data stored in user profiles data 136 includes one or more of the following types of information (among other things) that can be used to generate recommendations as described herein: the user's prior purchase history (including dates of purchase), the user's ratings of various items of content, the current content of the user's personal shopping cart(s), a listing of items that were recently removed from the shopping cart without being purchased, a list of items that were recently viewed by that user, and previous playlists generated for the user. Each of the above-listed items can be used to identify items of content in which the user may be interested. More details are provided below.

In regard to the user's ratings stored in user profiles data 136, users are provided the opportunity to rate items of content. For example, in a music system, users can rate how much they like various songs. This information is stored in the user's profile.

Similar content data 138 includes a table (or other data structure) which maps items to lists of similar items without the need of users to rate items. In accordance with one aspect of the technology described herein, correlation server 124 periodically (such as once per week or other time interval) generates the mapping of items to similar items from data which reflects the collective interest of the community of users of the system. More specifically, the item-to-item mappings are generated by an offline process which identifies correlations between known interests of users in particular items. For example, the mappings can be generated by analyzing prior purchase histories (or prior browsing histories) to identify correlations between purchases (of viewings) of similar items. For example, the system can determine that items A and B are similar because a relatively large portion of the user community that purchased item A also purchased item B. The item-to-item mappings could also reflect other types of similarities, including content-based similarities extracted by analyzing item descriptions or content. Many different technologies for identifying similar items and making recommendations are known in the art and can be used with the technology described herein. No one particular scheme is required. Examples of technology for making recommendations can be found in (bit are not limited to) U.S. Pat. Nos. 6,266,649 and 6,064,980, both of which are incorporated herein by reference.

In accordance with one aspect of the technology described herein, the similar items lists read from the table are appropriately weighted (prior to being combined as described below), based on the indicia of the user's affinity for or current interest in the current item of known interests. For example, in one embodiment described below, if an item of known interest was previously rated by the user, the rating is used to weigh the corresponding similar items list. Similarly, the similar items list for a song that was purchased in the last week may be weighted more heavily than the similar items list for a song that was purchased two years ago.

FIG. 1 shows web server 120, application server 122, correlation server 124 and database system 126 as four separate hardware devices communicating via a network. In other embodiments, the four servers can be implemented in one physical device, less than four physical devices, or more than four physical devices.

Figure 2:
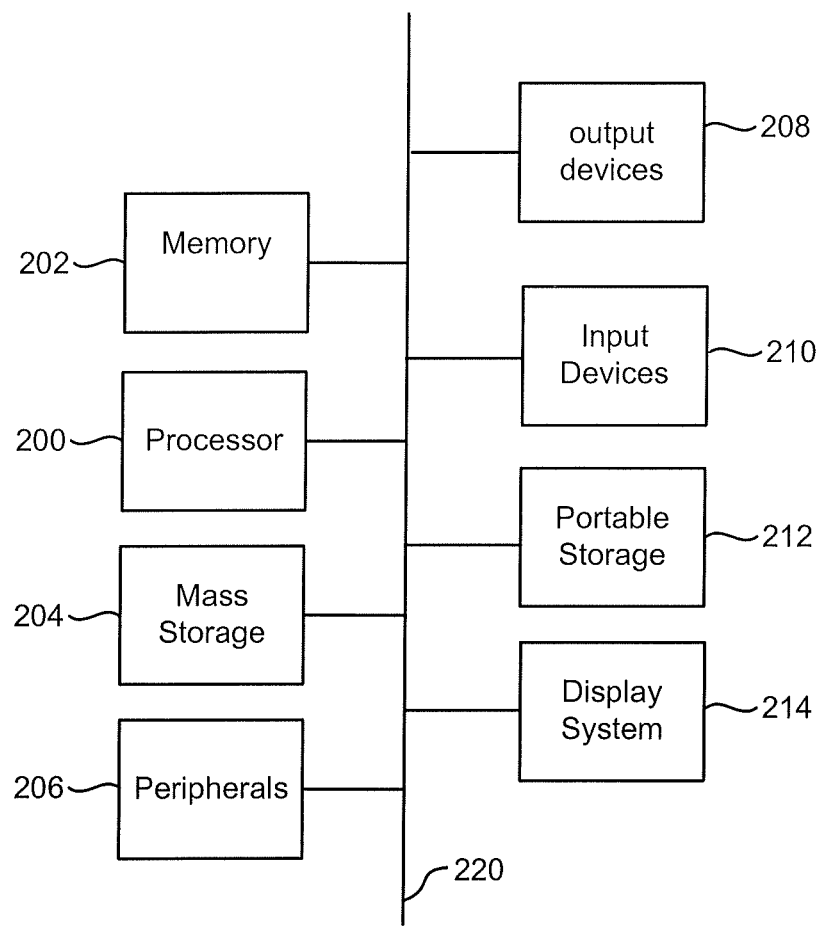
FIG. 2 is a block diagram of one embodiment of a computing system that can be used to implement components of FIG. 1.

FIG. 2 is a high level block diagram of the computing system which can be used to implement any of the computing devices (including the servers) of FIG. 1. The computing system of FIG. 2 includes processor 200, memory 202, mass storage device 204, peripherals 206, output devices 208, input devices 210, portable storage 212, and display system 214. For purposes of simplicity, the components shown in FIG. 2 are depicted as being connected via single bus 220. However, the components may be connected through one or more data transport means. In one alternative, processor 200 and memory 202 may be connected via a local microprocessor bus, and the mass storage device 204, peripheral device 806, portable storage 212 and display system 214 may be connected via one or more input/output buses.

Processor 200 may contain a single microprocessor, or may contain a plurality of microprocessors for configuring the computer system as a multiprocessor system. Memory 202 stores instructions and data for execution by processor 200. If the technology described herein is wholly or partially implemented in software, memory 202 (which may include one or more memory devices) will store the executable code for programming processor 200 to perform the processes described herein. In one embodiment, memory 202 may include banks of dynamic random access memory, high speed cache memory, flash memory, other nonvolatile memory, and/or other storage elements.

Mass storage device 204, which may be implemented with a magnetic disc drive or optical disc drive, is a nonvolatile storage device for storing data and code. In one embodiment, mass storage device 204 stores the system software that programs processor 200 to implement the technology described herein.

Portable storage device 212 operates in conjunction with a portable nonvolatile storage medium, such as a floppy disc, CD-RW, flash memory card/drive, etc., to input and output data and code to and from the computing system of FIG. 2. In one embodiment, system software for implementing the present invention is stored on such a portable medium, and is input to the computer system via portable storage medium drive 212.

Peripheral devices 206 may include any type of computer support device, such as an input/output interface, to add additional functionality to the computer system. For example, peripheral devices 206 may include a network interface for connecting the computer system to a network, a modem, a router, a wireless communication device, etc. Input devices 210 provides a portion of a user interface, and may include a keyboard or pointing device (e.g. mouse, track ball, etc.). In order to display textual and graphical information, the computing system of FIG. 2 will (optionally) have an output display system 214, which may include a video card and monitor. Output devices 208 can include speakers, printers, network interfaces, etc.

The components depicted in the computing system of FIG. 2 are those typically found in computing systems suitable for use with the technology described herein, and are intended to represent a broad category of such computer components that are well known in the art. Many different bus configurations, network platforms, operating systems can be used. The technology described herein is not limited to any particular computing system.

Figure 3:
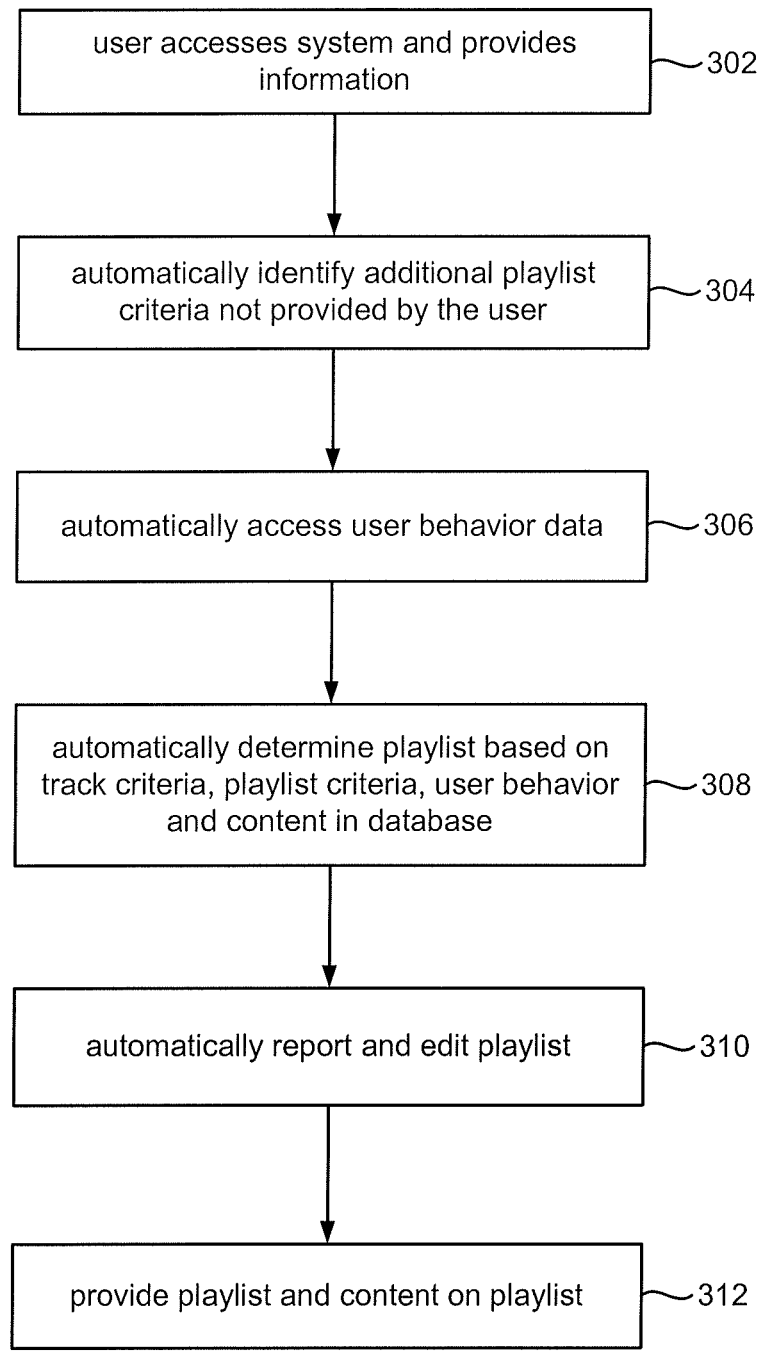
FIG. 3 is a flow chart describing one embodiment of a process for dynamically and automatically generating playlists.

FIG. 3 is a flow chart describing one embodiment of a process for dynamically generating playlists using the system of FIG. 1, or another system. In step 302, a user accesses the system and provides information about the potential playlist. This may include the user providing all or a subset of the track criteria and/or all or a subset of the playlist criteria. In some embodiments, the user provides neither. In step 304, the system will identify additional playlist criteria not provided by the user in step 302. In step 306, the system will automatically access some or all of the user behavior data described above. In step 308, the system will automatically generate a playlist based on the track criteria, playlist criteria, user behavior data, and content in the content data 130. This newly created playlist will be stored in the appropriate user profile of user profiles data 136. In step 310, the newly generated playlist will be graphically reported to the user and the user will be provided with the ability to edit the playlist. In step 312, the user will be provided with the opportunity to acquire the playlist and/or the items of content identified in the playlist, that are not already owned by the user. In one embodiment, the user can purchase the playlist file and the various music or video files identified in the playlist that they do not already owned. In another embodiment, the music and video identified in the playlist can be streamed to the user. In one embodiment, the playlist is reported (and, possibly, edited) on a computer monitor or other display device.

FIGS. 4A-C are flow charts describing different embodiments of a process for a user accessing the system and providing information to the system. For example, the methods of FIGS. 4A-C can be used to implement step 302 of FIG. 3. In one embodiment, the system providing the playlist is a web site or application that sells/distributes music and/or video. However, other types of web sites and other types of systems can also be used with the technology described herein.

In step 402 of FIG. 4A, a user is accessing the web site and/or application in order to browse, make purchases, etc. In step 404, the user decides that the user wants a playlist and makes a request for a playlist. In one embodiment, a web site can have an interface item such as a button or link that the user will select in order to request that a playlist be generated for that user. In step 406, a graphical user interface will be generated and displayed to the user for the user to provide various information about the playlist desired. That user interface will have interface items (e.g., text boxes, drop down menus, radio buttons, etc.) for the user to provide information about track criteria (artist, genre, album, year, period of time, country of origin, etc.) and playlist criteria (event type, duration, tempo curve, seed). The seed can be a seed track or seed artist. A seed track is the first track added to the playlist. Other tracks will be added to the playlist that are similar to or coordinate with that seed track. If a seed artist is identified, then the first track added to the playlist will be by the seed artist. In one embodiment, the user is not required to enter all of the possible information. For example, the user may only wish to enter an event type. Alternatively, the user may wish to only enter a seed.

The process of FIG. 4A contemplates a scenario where the user is requesting a playlist to be generated. The process of FIG. 4B contemplates a situation where the system first approaches the user to offer the playlist to the user. In step 420 of FIG. 4B, the user is interacting with the web site or application. In step 422, the system determines that the user is a candidate for a playlist and offers to generate a playlist for the user. In one embodiment, the system determines that if the user is browsing music or video then the user is a candidate for a playlist. The system provides a dialog box to the user asking the user if the user wants to have a playlist generated. That dialog box can include a "Yes" button and a "No" button (or other selection item). Other interface items can also be provided in the dialog box. If the user does not accept the offer (step 424) to generate a playlist, then the user's previous interaction with the web site or application continues (step 426). If the user accepts the offer to generate a playlist, then (at step 428) the user is provided with a user interface (as described above with respect to step 406) in order to provide all or a subset of track criteria and/or playlist criteria.

The process of FIG. 4C contemplates a situation where the user did not request a playlist be generated and the user was not offered to have the system generate a playlist for the user. Rather, the process of FIG. 4C includes the system determining on its own to generate a playlist and generating it without any input from the user. Subsequent to the playlist being generated, that playlist is then offered to the user. In step 440, the user is interacting with the web site or application. In step 442, the user's behavior is observed to determine whether that user would be a good candidate for a playlist. For example, if the system generates a music playlist, step 442 could include determining whether the user is browsing a portion of the web site that is used for selling music. If that user would be a good candidate for a playlist (step 444), then the system will automatically proceed with generating a playlist (step 448). Otherwise, the user's interaction with the web site or application will continue (step 446). For example, if the user is browsing the music page of a web site, a playlist may be automatically generated. On the other hand, if the user has spent less than a predetermined amount of time on the music portion of a web site, a playlist may not be generated. Other indicia for determining whether there is interest in a playlist can also be used. The process of FIG. 4C provides one example of the system determining whether the user is interested in a playlist without asking the user directly. Note that the processes of FIGS. 4A-4C can be performed by a combination of web server 120 and application server 122.

Figure 5:
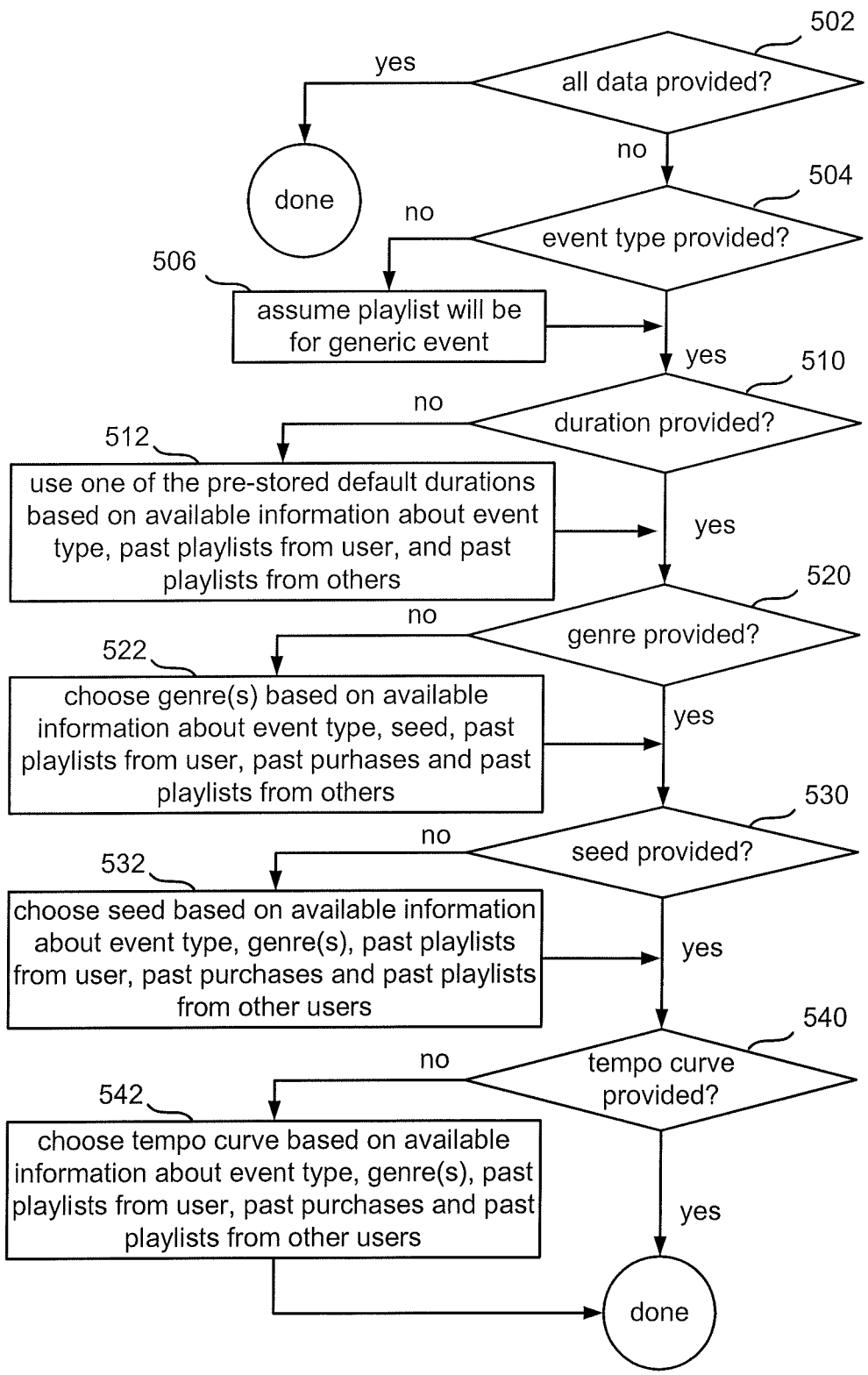
FIG. 5 is a flow chart describing one embodiment of a process for identifying criteria for a playlist.

FIG. 5 is a flow chart describing one embodiment of a process for identifying playlist criteria not otherwise identified by the user. The process of FIG. 5 can be used to implement step 304 of FIG. 3. In one embodiment, the process of FIG. 5 is performed by application server 122, with the help of database system 126. In step 502 of FIG. 5, the system determines whether all the playlist criteria has been provided. For example, if the user in step 302 of FIG. 3 provided all of the playlist criteria, then the process of FIG. 5 is done because no additional information needs to be gathered. If the user did not provide all of the playlist criteria, then additional playlist criteria will be gathered.

In step 504 of FIG. 5, it is determined whether the event type was provided. If the user did not provide an event type in step 302, then the system will assume that the playlist will be a for a generic event type. In one embodiment, the generic event type will have a default duration and a default tempo curve. If the user did provide an event type (or after assuming a generic event type in step 506), the system will determine whether the user provided a playlist duration. In one embodiment, the playlist duration can be provided in minutes, hours, etc. If the user did not provide a playlist duration (step 510), then at step 512 a default duration will be used for the event type. In another embodiment, an event template can include multiple durations associated with that particular event type. Based on durations from past playlists from the user and/or past playlists from other users, one of those default durations can be used. For example, if a particular event type has default durations of one hour, two hours and three hours, and the user has previously purchased three playlists that were each an hour, then the system will choose the one hour default duration. Other means for choosing one of the default durations can also be used.

After choosing the default duration (or if the duration was provided), then in step 520 it is determined whether a genre was provided. If no genre was provided by the user, then one or more genres are chosen based on the information about the event type. For example, each event type may be associated with one or a set of genres suitable for that event type. Of a set of genres associated with an event type, the system may choose a subset of genres based on the seed, or past playlists from that user, past purchases of music from that user, and past playlists from other users. For example, if the event type selected is "business cocktail party" and that event type is associated with jazz, classical and R&B, the system may filter those genres to only select classical and jazz genres if past playlists from the user and past music purchases all pertained to only jazz music and classical music. If the user had provided a genre in step 302 of FIG. 3, then that genre or set of genres are used.

After choosing a genre in step 522 (or if a genre was already preselected by the user), then in step 530 it is determined whether a seed was provided. If no seed was provided, a seed will automatically be chosen by the system based on event type, genres, past playlists from that user, past purchases and past playlists from other users. In one embodiment, each event type has an event template that includes a set of seed songs and a seed artist. The set of default seeds can be reduced by the genres chosen above. Then, an appropriate seed track can be chosen based on past playlists from this user, and past purchases of playlists and songs from this and other users.

After a seed is chosen in step 532, or if a seed was already provided, the system determines whether a tempo curve was provided (step 540). If a tempo curve was provided by the user, then the process of FIG. 5 is finished and the playlist criteria (including event type, duration, genre, seed and tempo curve) are stored in a playlist generation file temporarily on application server 122 and then subsequently (and persistently) in the user's profile in user profiles data 138. If no tempo curve is provided by the user, then the system will choose a tempo curve in step 542 based on the available information about event type, genre, past playlists from the user, and past purchases and past playlists from other users. For example, each event type will have a set of one or more tempo curves associated with that event type. Based on the genre, duration and seed, the list of associated tempo curves will be reduced to one tempo curve. Additionally, past playlists from that user as well as past playlists from other users can be used to also filter the number of tempo curves down to a single choice in tempo curves.

Figure 6:
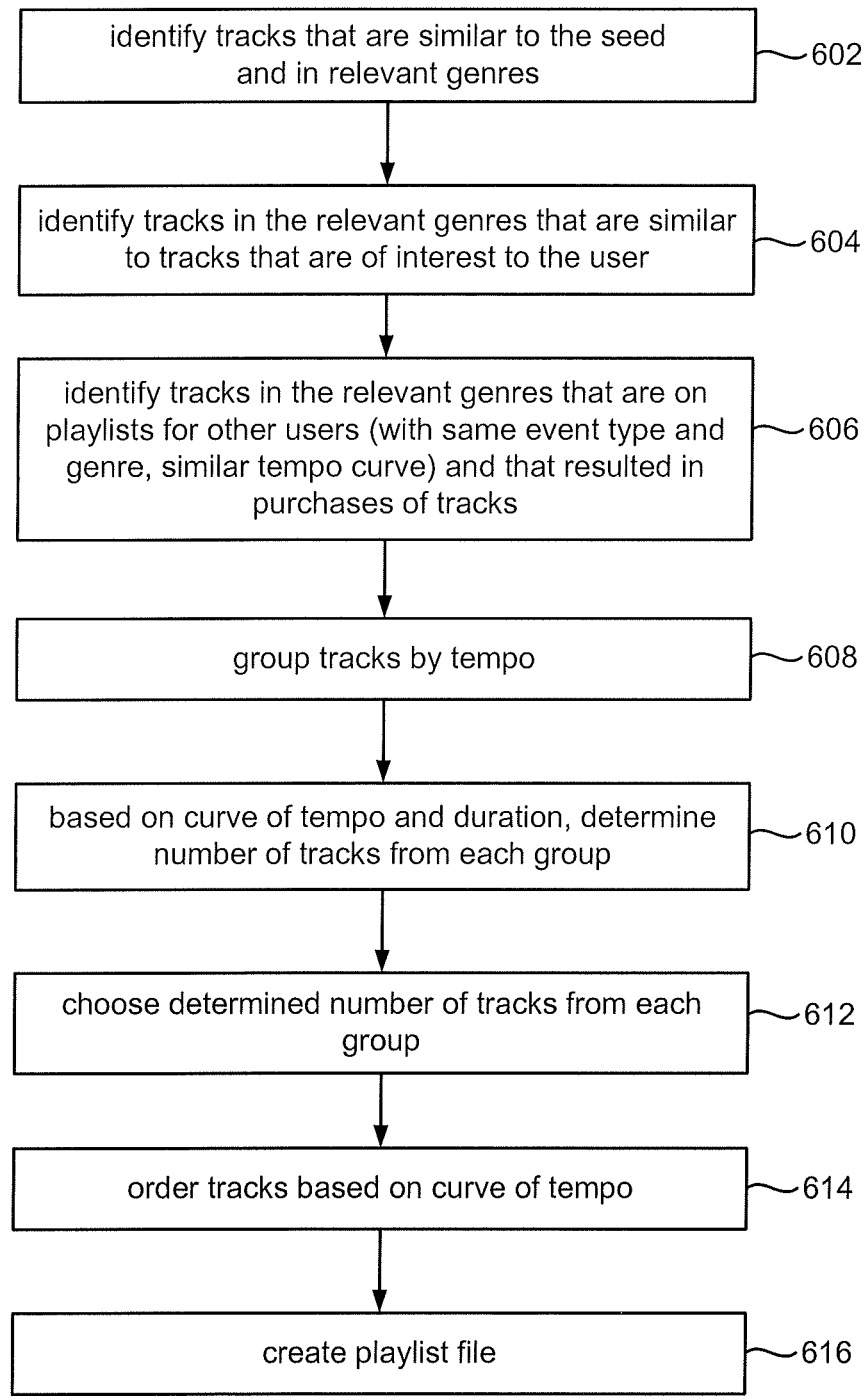
FIG. 6 is a flow chart describing one embodiment of a process for determining a playlist.

FIG. 6 is a flow chart describing one embodiment of a process for automatically determining a playlist based on track criteria, playlist criteria, user behavior and content in a database. For example, the process of FIG. 6 can be used to implement step 308 of FIG. 3. The method described by FIG. 6 is primarily performed by application server 122, with the assistance of correlation server 124 and database system 126.

In step 602 of FIG. 6, the system will identify tracks that are similar to the seed and in the relevant one or more genres. That is, using similar content data 138, the system can determine tracks that are similar to the seed track (or to tracks of a seed artist). Those tracks will then be filtered to include only those tracks of the relevant genres. This step, therefore, includes identifying tracks based on other users' behavior (and, possibly, the current user's behavior).

In step 604, the system will identify tracks from the relevant genre that are also similar to tracks that are thought to be of interest to the user. Correlation server 124 will identify tracks (based on this particular user's behavior) that are thought to be of interest to the user based on the user's prior purchases and prior actions that indicate interest in content. For example, correlation server 124 will access user profiles data 136 to identify those tracks previously purchased by the user, rated high by the user, currently in the user's shopping cart, were recently removed from the user's shopping cart, were recently viewed by the user or were on previous playlists for the user. For each of these tracks, correlation server 124 will access similar content data 138 to identify similar tracks. The sets of similar tracks will be merged and then filtered to include only those tracks of the relevant genres. As discussed above, the similar content data is based on the behavior of other users (and, possibly, the current user).

In step 606, the system will identify tracks in the relevant genres that are in other users' playlists and that were previously purchased by other users using the same event type, the same genre and similar tempo curve. Thus, this step identifies tracks based on other users' behavior (and, possibly, the current user's behavior).

In step 608, all the tracks identified in steps 602, 604 and 608 are grouped based on tempo. For example, if three tempo descriptors are used (fast, medium and slow), then all of the fast tracks are grouped together, all the medium tracks are grouped together, and all the slow tracks are grouped together. In step 610, based on tempo curve and duration, it is determined how many tracks from each group will be used and in what order. In step 612, the determined number of tracks from each group (determined in step 610) are chosen. In one embodiment, the choice is random. In another embodiment, tracks that have been rated highly by the user or are similar to tracks rated highly by the user are chosen first. In step 614, the tracks are ordered based on the tempo curve. By the end of step 614, the playlist has been generated. All the information for the playlist is then stored in a playlist file in step 616. Examples of playlist file formats include PLS, M3U and XML. Other file formats can also be used. The playlist file is stored in the user profile data 136.

Figure 7:
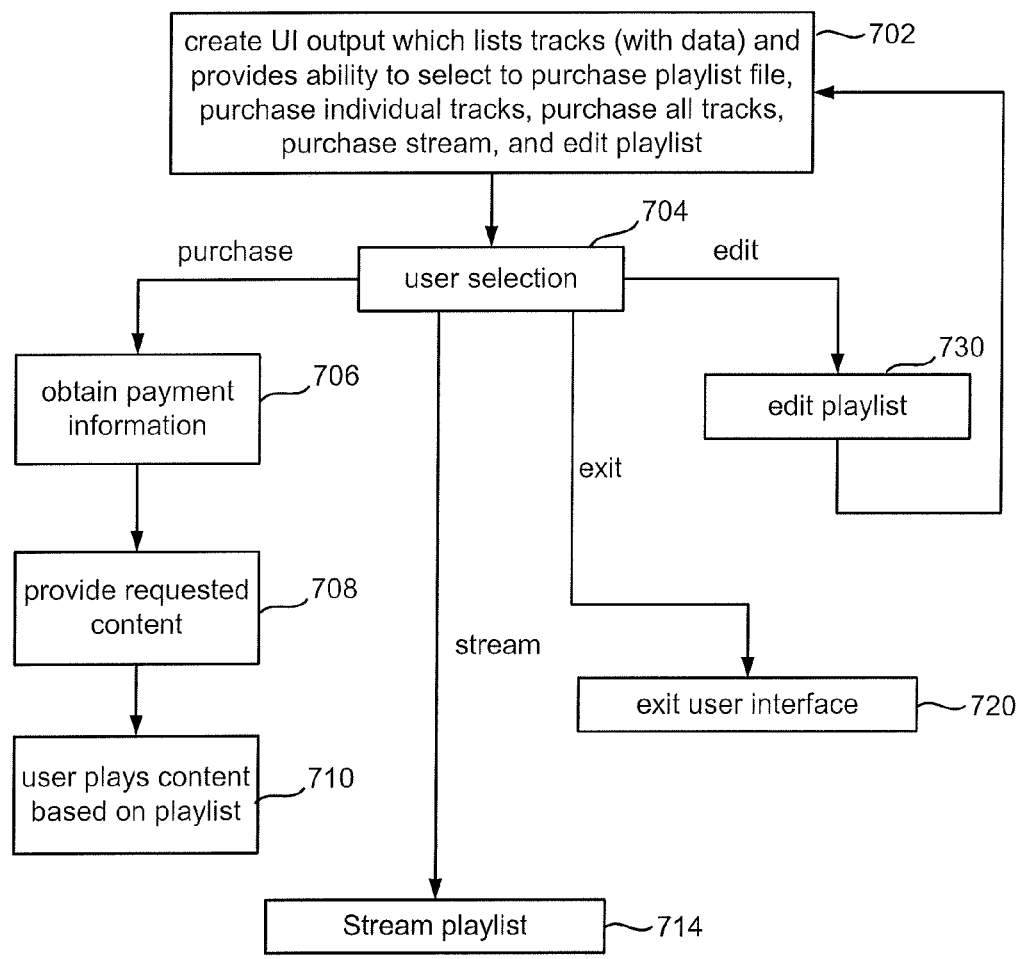
FIG. 7 is a flow chart describing one embodiment of a process for reporting a playlist and allowing an entity to acquire and/or edit the playlist and its contents.

FIG. 7 is a flow chart describing one embodiment of a process for reporting a playlist and then allowing an entity to acquire and/or edit the playlist and its content. In one embodiment, the process of FIG. 7 is an example implementation of steps 310 and 312 of FIG. 3. In step 702, the system creates a user interface output which lists the various tracks and associated data (album, artist, year, track duration, genre, etc.). For example, application server 122 will communicate the content of the playlist to web server 120. Web server 120 will build, using HTML, a web page which graphically depicts a listing of the playlist and its contents. For each track, the track can be identified by name, artist, album, title, genre, duration, etc. In one embodiment, the user interface will include a button (or other item) that the user can select to buy all the tracks on the playlist. In some embodiments, there could be a button or check box next to each track so that the user can choose individual tracks to purchase. The user interface will also include an input item (e.g., button or link) which the user can select in order to edit the playlist, an input item (e.g., button or link) which the user can select in order to stream the tracks of the playlist, and an input item (e.g., button or link) which the user can select in order to exit the user interface. In response to the user interface, the user can then make a selection in step 704.

If the user selects to purchase the playlist or the tracks identified by the playlist, then in step 708 the system will obtain payment information. For example, the user may input credit card information and other billing information. In one embodiment, payment information is provided to a third party service for conducting a credit card transaction. After the transaction has been completed, the requested content is provided to the user in step 708. In one embodiment, step 708 includes transferring the appropriate files from content database 130 to the appropriate user's computing device. The playlist file can also be transferred from user profiles data 136 to the user's computing device. In one example, the data is transferred using FTP; however, other transfer protocols can also be used to transfer the data. For example, the file can be e-mailed to a user account. At the conclusion of step 708, the purchased files will be stored on the user's computing device. In step 710, the user will play the content based on the playlist. In one embodiment, step 710 includes playing the tracks in the order listed on the playlist using the appropriate media player on the user's computing device.

If the user chose to stream the data in step 704, then the playlist is streamed in step 714. More details of step 714 are provided below. If the user chose to exit the user interface, then the user exits the user interface in step 720. If the user chose to edit the playlist, then in step 730 the playlist is edited, as discussed below. After step 730, the process loops back to 702 and displays the edited playlist on an updated user interface.

Figure 8:
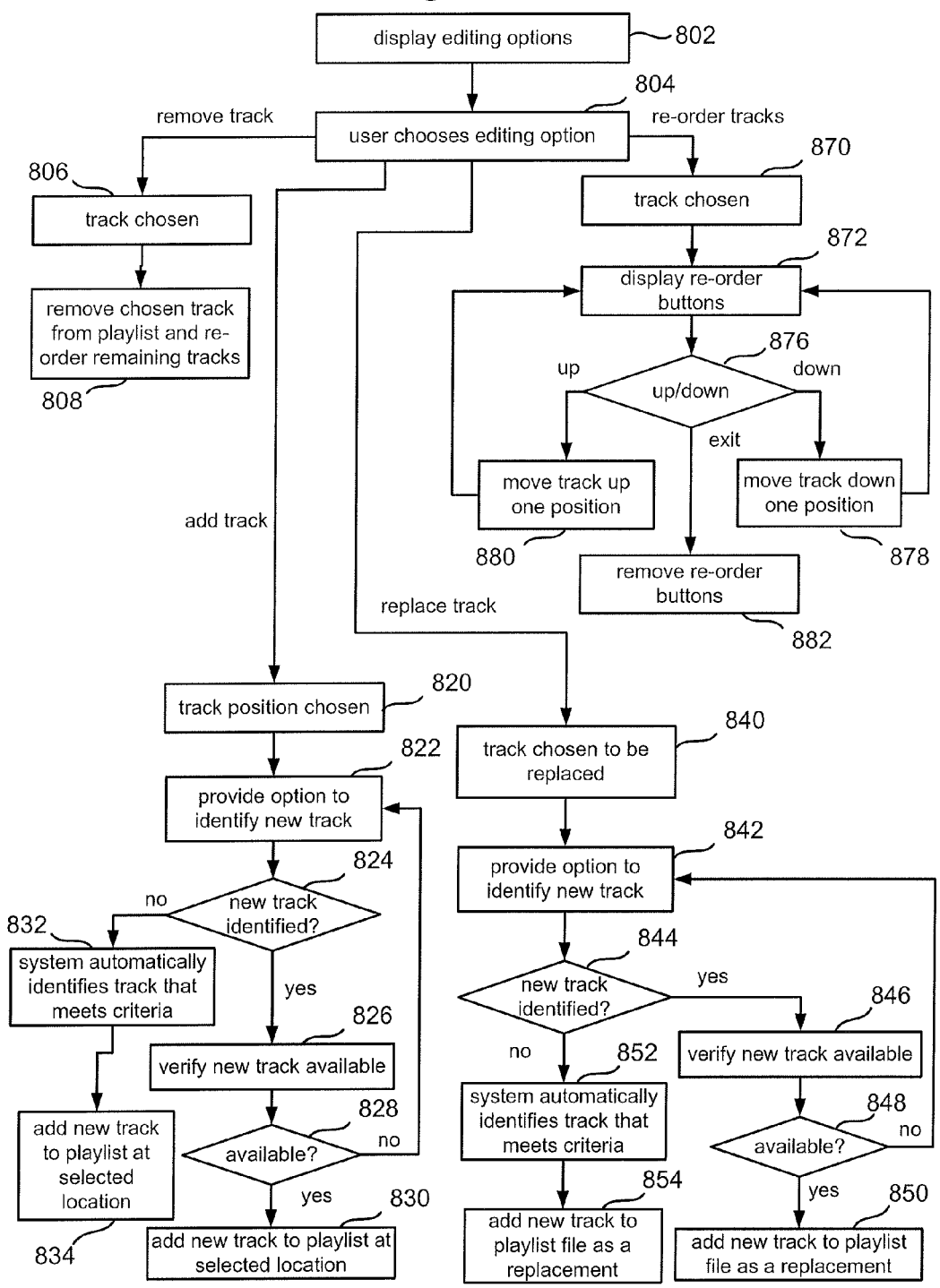
FIG. 8 is a flow chart describing one embodiment of a process for editing a playlist.

FIG. 8 is a flow chart describing one embodiment of a process for editing a playlist. The process of FIG. 8 is one example implementation of step 730 of FIG. 7. The process of FIG. 8 is primarily performed by application server 122. However, various portions of FIG. 8 are performed by web server 120 and database system 126.

In step 802 of FIG. 8, a user interface is provided (e.g., a dialog box with a set of buttons or other items) which displays the editing options available to the user. In one embodiment, the user has the option to remove a track, add a track, replace a track or reorder the tracks. In other embodiments, other editing options can also be provided. In step 804, a choice is received from the user. For example, the user will select a button or a link which will cause an HTTP transmission to web server 120, which will forward the request to application server 122.

If, in step 804, the user chooses to remove a track, then in step 806 the user chooses which track to remove and that choice is received at application server 122. One embodiment of step 806 includes providing a user interface with a listing of all the tracks and a button (or other user interface item) for each track. The user will choose which track by selecting the appropriate button. That choice will be relayed to application server 122. In step 808, that track is removed from the playlist and the remaining tracks are reordered. For example, if there are 20 tracks in the playlist and track 10 is removed, then tracks 11 through 20 then become tracks 10 through 19.

If the user (in step 804) chose to add a track, then the position to add the track is chosen by the user in step 820. That is, a user interface will be provided (e.g., dialog box) to the user with a list of the tracks in sequence and a button between each of the tracks to identify various potential locations to add a track. The user will choose the appropriate button which will cause a signal indicating the choice to be sent to application server 122. In step 822, another dialog box will be provided to the user for the user to identify a new track to insert into the playlist. In one example, the user can enter a title or other identifying information. If the user inputs a title or other identifying information (step 824), then the system will verify whether that track is available in step 826 by sending that identifying information to database system 126 in order to search content data 130 for the track. If the track is available in content data 130 (see step 828), then that track is added to the playlist at the selected location in step 830. If, in step 828, it is determined that the track is not available in content data 130, then the process loops back to step 822 and provides a dialog box for the user to enter new track identifying information.

If, in step 824, the user did not enter track identifying information, then the system will automatically identify a new track to add that new track into the playlist. Step 832 is performed by using the criteria from steps 302 and 304 of FIG. 3 to identify the track that best satisfies the criteria from those tracks stored in content data 130. That identified track is automatically added to the playlist at the selected location in step 834.

If, in step 804, the user chose to replace a track then in step 840 the user is given the opportunity to choose which track to replace. In one embodiment, a listing of the tracks in the playlist is provided with a button next to each track. Alternatively, the name of each track can be used to label a set of buttons or links. The user will choose one of those buttons or links, and in step 842 the system will provide an option to identify the new track (similar to step 822). If the user identifies a new track (step 844), then the system will attempt to verify whether the track is available in step 846 (similar to step 826). If the track is available (step 848), then that track is added to the playlist as a replacement for the track chosen in step 840 (step 850). If the track was not available (step 848), then the user is provided the option to identify the track once again in step 842. If the user did not identify the track (step 844), then the system will automatically identify a track in step 852 that best meets the criteria provided in steps 302 and 304 of FIG. 3. That track is automatically added to the playlist in step 854 as a replacement for the track identified in step 840.

If the user chose to reorder the tracks in step 804, then in step 870 the user will be provided with a user interface (e.g., dialog box) that lists all the tracks with a button or check box next to each track. One of those tracks can be chosen in step 870 by the user. Other means for choosing can also be used. The user's choice is communicated to application server 122. After the user chooses a track to move, then in step 872 re-order buttons will be provided on the user interface. For example, an "up" button and a "down" button will be provided. If the user chooses the "up" button in step 876, then the track selected in step 870 is moved up one position in the playlist. The process then returns to step 872. If the user chose the "down" button in step 876, then the track chosen in step 870 is moved down one position in the playlist in step 878 and the process continues back to step 872. Instead of pushing the "up" button or the "down" button, the user can push an "exit" button which causes the "up" and "down" buttons to be removed and the reorder process to complete in step 882.

Figure 9:
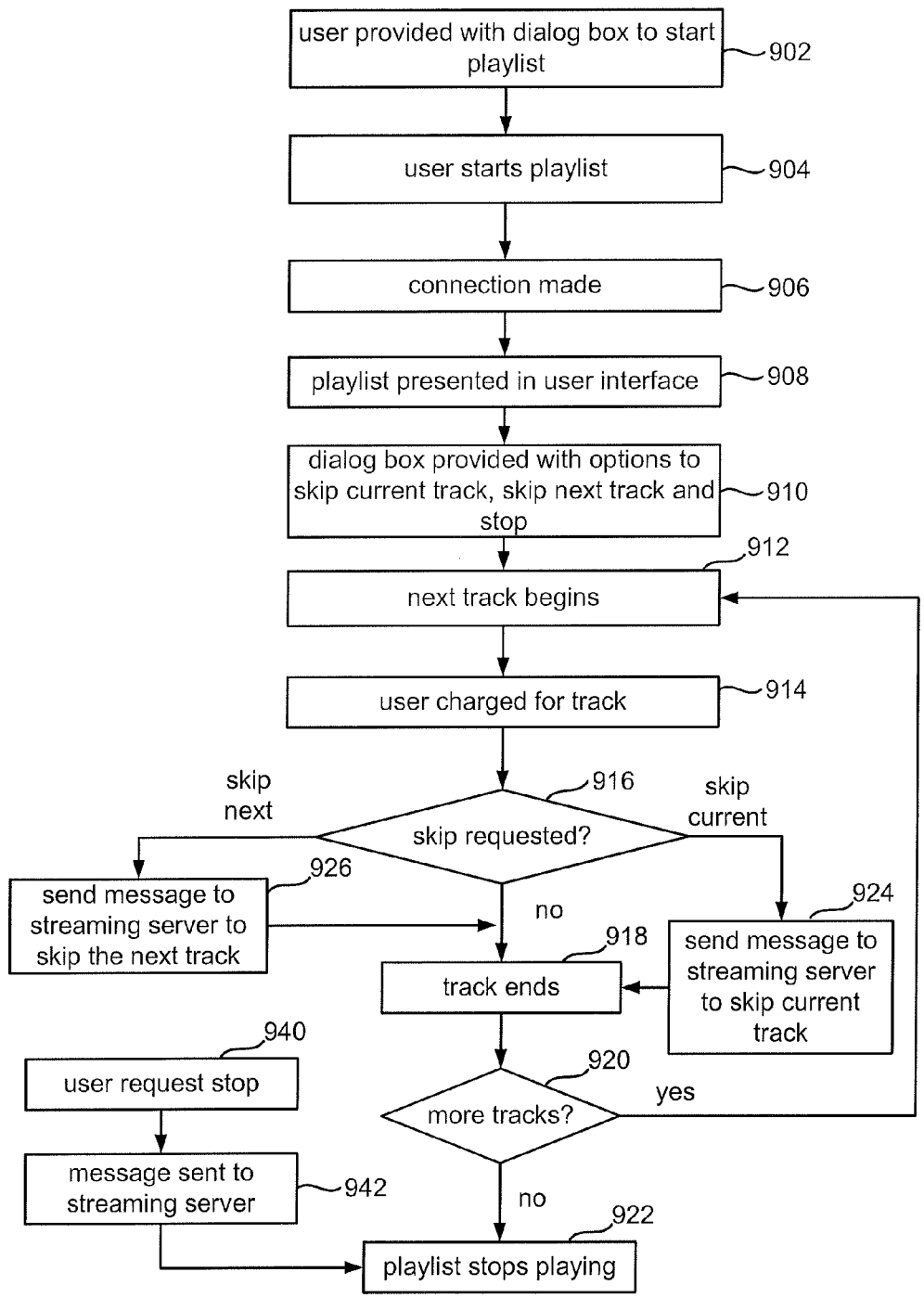
FIG. 9 is a flow chart describing one embodiment of a process for making a change to a playlist while streaming the contents of the playlist.

Looking back at step 714 of FIG. 7, a user has the option to stream the content of the playlist in the order identified by the playlist. FIG. 9 is a flow chart describing one embodiment of a process for streaming the contents of a playlist. That is, the process of FIG. 9 is one example implementation of step 714 of FIG. 7. In one embodiment, the user will pay for the contents of the playlist prior to commencing the streaming of content. In other embodiments, the user will pay for each track of the playlist only when that track is streamed. Thus, if the user stops the streaming half way through the playlist, the user would have only paid for half of the tracks identified on the playlist. In that regard, the process of FIG. 9 allows the user to skip songs in the playlist while the playlist is being streamed. The user will not pay for any song that is skipped and never played.

In step 902 of FIG. 9, the user is provided with a dialog box requesting that the user confirm that streaming the playlist is to commence. In step 904, user will confirm that the user wishes to start the playlist being streamed by interacting with the dialog box, which causes the appropriate message to be sent to application server 122. In step 906, a connection is made between application server 122 and the appropriate user computing device so that the data can be streamed. In step 908, the playlist is presented in a user interface on the user's computing device. In step 910, a dialog box is provided on the user's computing device (inside or outside the user interface of step 908) which includes buttons for the user to skip the current track, skip the next track or stop. In step 912, the next track on the playlist begins being streamed. In step 914, the user is charged for the track that just commenced streaming. In one embodiment, when the user first chooses to have the playlist streamed, the user will be provided with a user interface to allow the user to input credit card and other billing information so that as each song is played the user will be charged the appropriate amount to the user's credit card.

In step 916, the system monitors for whether the user has pushed the skip next track, skip current track, or stop buttons. This monitoring is performed the entire time while a track is being streamed. If the user chooses to skip the current track, then a message is sent to application server 122, which serves as a streaming server, to skip the current track and start the next track. In other embodiments, a different server can be used to stream the data. In step 918, the current track is immediately brought to the end of the track. In step 920, it is determined whether there are any more tracks in the playlist. If not, the playlist stops playing. If there are more tracks in the playlist, then the process loops back to step 912 and the next track begins playing.

If in step 916, it is detected that the user requested to skip the next track, then a message is sent in step 926 to the streaming server (e.g., the application server 122) to skip the next track. When the message to skip the next track is received by the server streaming the tracks, a pointer indicating the current location of the playlist is moved down one position so that the next track is skipped. When the current track ends in step 919, the system determines in step 920 whether there are more tracks left in the playlist. If there are still more tracks after the track is skipped, then the subsequent track begins to be played in step 912. If there are no more tracks to stream, then the playlist stops playing.

If at any time during the process of FIG. 9 the user chooses to stop the playlist from streaming (step 940), then a message is sent in step 942 to the appropriate server streaming the data to stop streaming. In step 922, the playlist stops playing.

Figure 10:
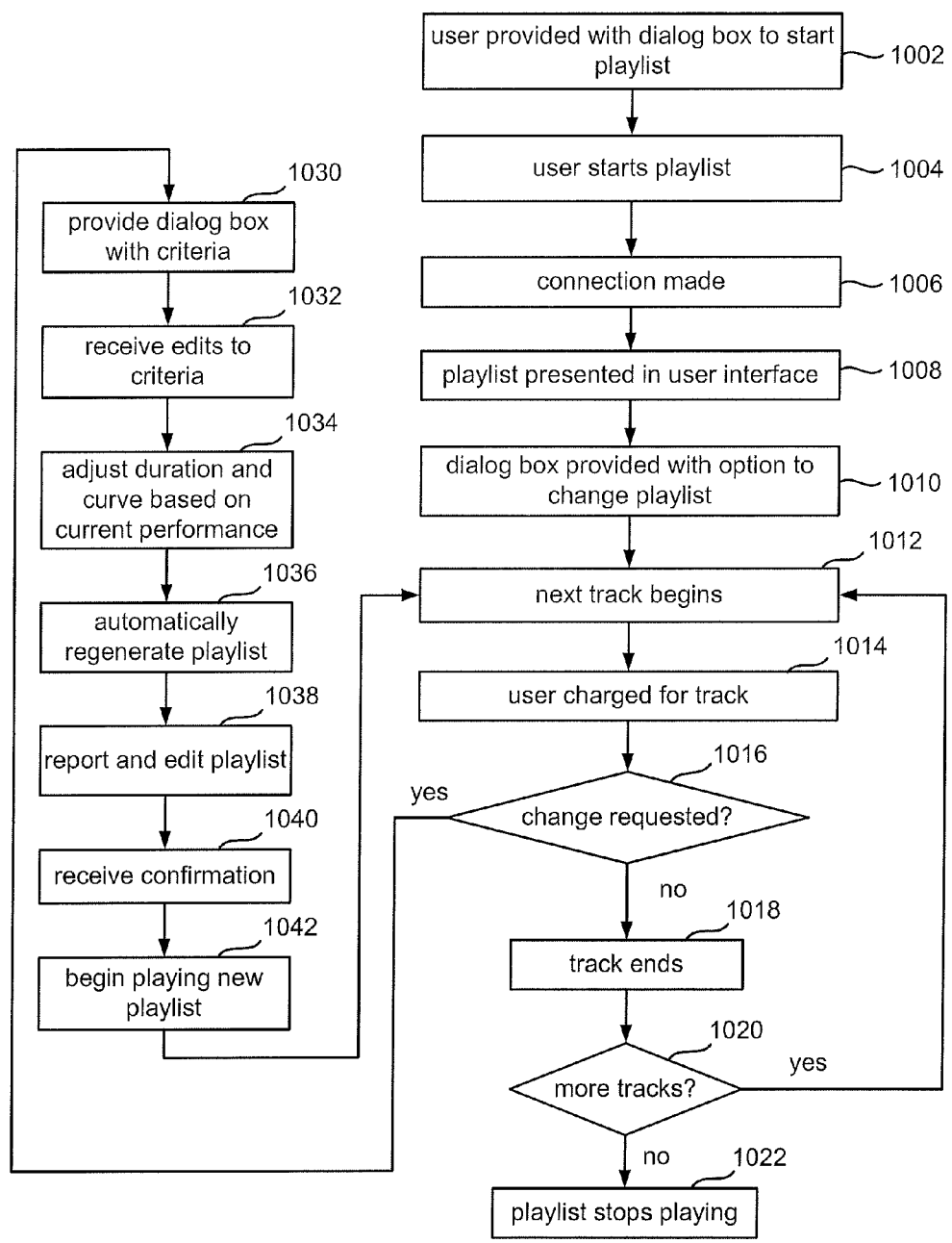
FIG. 10 is a flow chart describing one embodiment of a process for making a change to a playlist while streaming the contents of the playlist.

FIG. 10 is a flow chart describing another embodiment for streaming the contents of the playlist. In the process of FIG. 10, the user can change the playlist while the playlist is streaming. This change can include changing the criteria used to choose tracks so that the playlist is reconfigured with new content based on the new criteria and the streaming will continue with the updated playlist. The process of FIG. 10 can be used to implement step 714. In one embodiment, the features of FIG. 10 can be combined with the features of FIG. 9 so that the user has the option of editing the playlist or skipping songs.

In step 1002 of FIG. 10, a user is provided with a dialog box to commence playing of the playlist (similar to step 902). In step 1004, the user requests the playlist to be streamed. In step 1006, a connection is made between the server streaming the tracks and the user's computing device (similar to step 906). In step 1008, the playlist is presented in the user interface (similar to step 908). In step 1010, a dialog box is provided on the user computing device providing the user with a button to push (or other item to select) if the user wants to edit the playlist. In step 1012, the next track on the playlist begins streaming. In step 1014, the user is charged for the track that just began streaming. In step 1016, the system will constantly monitor, while streaming the current track, whether a change is requested. If no change is requested while the track is playing, then eventually the track will end in step 1018 and in step 1020 the system will determine whether there are any more tracks to play. If not, the playlist stops streaming in step 1022. If there are more tracks to play, the process loops back to step 1012 and the next track begins playing.

If, while any track is playing, the user requests a change (see step 1016), then in step 1030, the criteria for the current playlist is presented in a dialog box such that the criteria can be edited. For example, next to each of the criteria can be text boxes for entering new criteria, radio buttons, drop down menus, etc. In step 1032, the system receives the edits to the criteria. The user can edit one or multiple sets of criteria. In step 1034, the duration and tempo curve are adjusted based on current performance. For example, if the playlist is supposed to be two hours and the playlist is half way through the streaming, then when regenerating the new playlist, the new playlist should only be one hour long to represent the remaining time. Similarly, if the playlist has already partially into the tempo curve definition, the new playlist only needs to regenerate to the portion of the tempo curve not already played. In step 1036, the playlist is automatically regenerated using the updated criteria. The process for generating criteria can be performed based on the process of FIG. 6. In step 1038, the new playlist is reported in the user interface on the user's computing device and the user is provided an opportunity to edit the playlist as described above. In step 1040, the user will be provided with a dialog box to confirm that the user intends to proceed with the new playlist. In step 1042, the new playlist begins streaming and the process continues in step 1012 with the next track beginning to stream.

Figure 11:
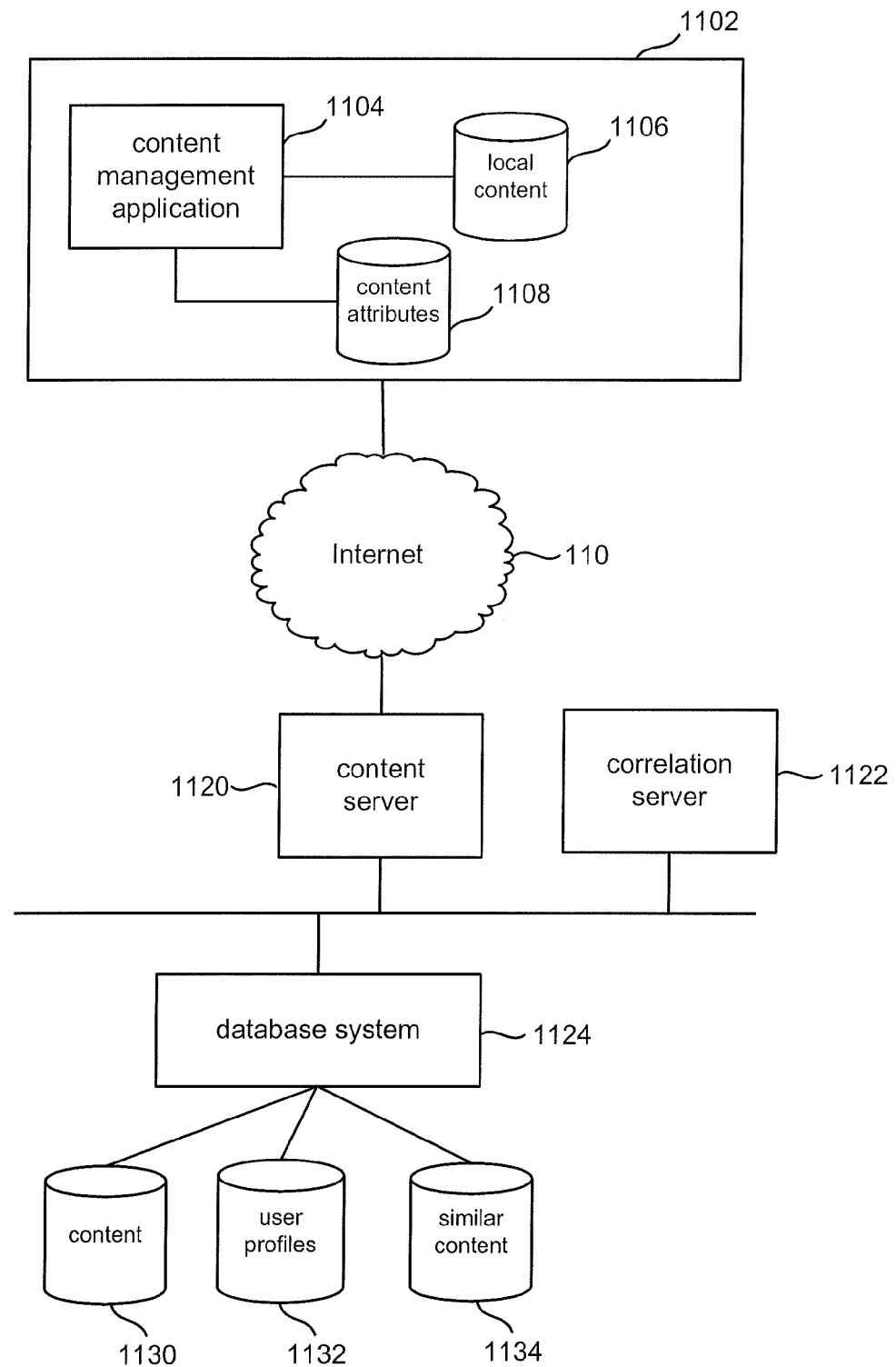
FIG. 11 is a block diagram of one embodiment of a system that can dynamically and automatically generate playlists.

FIG. 11 is a block diagram of another embodiment of a system that can dynamically and automatically generate playlists. The system of FIG. 1 contemplated that the user is interacting with an application remote from the user. The embodiment of FIG. 11 contemplates that the user will be interacting with a content management application 1104 installed on the user's computing device. FIG. 11 shows a user computing device 1102 that can be a desktop computer, notebook computer, personal digital assistant, telephone, smart appliance, etc. User computing device 1102 can be implemented using the system of FIG. 2 or other architectures. User computing device 1102 includes content management application 1104, a local content data structure 1106 and local content attributes data structure 1108 storing content attributes. For example, music and videos can be stored in local content 1106, while all or a subset of the track criteria and ratings can be stored in content attributes 1108. In one embodiment, content attributes 1108 and local content 1106 are combined into one data structure. Content management application 1104 can be an audio/video jukebox or other management software.

In the embodiment of FIG. 11, content management application 1104 will perform the automatic generation of playlists as described herein. In one example implementation, content management application 1104 will generate a playlist without accessing any other entities on a network. Content management application 1104 will only use data local to the computing device.

In another embodiment, the content management application 1104 will communicate with a content server 1120 via Internet 110. Content server 1120 communicates via a LAN with a correlation server 1122 (similar to correlation server 124) and database system 1124 (similar to database system 126). Database system has access to content data 1130, user profiles data 1132 and similar content data 1134. Content management application 1104 will communicate with content server 1120 to identify content stored in database 1130 that may be appropriate for a playlist. Additionally, past behavior data used by content management application 1104 to generate the playlist will be obtained from user profiles data 1132 and similar content database 1134 via database system 1124 and content server 1120.

FIG. 12 is a flow chart describing one embodiment of a process for operating the system of FIG. 11. In step 1202, a user of computing device 1102 accesses content management application 1104 and provides all or a subset of the track criteria and playlist criteria. In step 1204, the content management application 1104 will contact content server 1120 in order to obtain the appropriate behavior data. In step 1206, the content management application 1104 will identify any missing playlist criteria or track criteria using the behavior data, as described above. In step 1208, content management application 1104 will contact content server 1120 to obtain additional behavior data and information from content database 1130 in order to generate the playlist. In step 1210, content management application 1104 will automatically determine the playlist based on the track criteria, playlist criteria, user behavior data, content in local content database 1106 and (optionally) content in remote database 1130. In step 1212, content management application 1104 will report the playlist and allow the playlist to be edited (optional). For example, the computer monitor will include a graphical interface depicting the content of the playlist. In step 1214, content management application 1104 determines which content in the playlist is in local content 1106 and which content in the playlist is in remote content 1130, and the user will be provided with a user interface that indicates the content from the playlist that is not in the user's local content 1106. The user will be able to choose which of the tracks that the user wants to acquire, and those tracks will be acquired, as discussed above. The acquired tracks are transferred from content 1130 to local content 1106. In step 1216, the user can play the tracks in the playlist.

FIG. 13 is a flow chart describing another embodiment for operating the system of FIG. 11. In step 1302, the user accesses content management application 1104 and provides all or some of the track criteria and playlist criteria (similar to step 1202). In step 1304, the information provided in step 1302 sent from content management application 1104 to content server 1120. In step 1306, content server 1120 will identify additional track criteria and additional playlist criteria, as discussed above. In step 1308, content server automatically determines the playlist based on track criteria, playlist criteria, user behavior data and content in the content database 1130. In step 1310, the content server 110 sends the playlist to local application 1104. In step 1312, content management application 1104 presents the playlist to the user in a graphical user interface (e.g. on a display) and optionally allows the user to edit the playlist, as discussed above. In step 1314, content management application 1104 will determine if any of the content in the playlist is in the local content database 1106. The content management application 1104 will identify those tracks that are not in local content 1106 and provide a user interface for the user to purchase the content from content database 1130. That content will be purchased using methods known in the art. In step 1316, the user plays the tracks on the playlist using means known in the art.

One embodiment of the system for generating playlists includes receiving tempo curve information, event type information and duration information from an entity; accessing behavior information for the entity; accessing behavior information for other entities; automatically generating a playlist based on the tempo curve information, the event type information, the duration information, the behavior information for the entity, the behavior information for other entities and data about content; and presenting the playlist to the user on a display for a computing device. The user can then acquire the content, store the content locally and play the content.

One embodiment of the system for generating playlists includes accessing playlist criteria that describes one or more attributes of a playlist not particular to a single item of content, automatically generating a playlist at least partially based on the playlist criteria (the playlist identifies a plurality of items of content) and reporting the playlist.

One embodiment of the system for generating playlists includes accessing behavior data, automatically generating a playlist that identifies a plurality of items of content based on the behavior data, and reporting the playlist.

One embodiment of the system for generating playlists includes automatically determining a playlist that identifies items of content, communicating the items of content according to the playlist, receiving a request to change the playlist during communication of the items of content, automatically changing the playlist based on a set of criteria during the communication of the items of content, and continuing communication of the items of content. The continuing of communication is based on the changed playlist.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A machine implemented method for providing an identification of items of content, under control of one or more computer systems configured with executable instructions, comprising:
    storing behavior data of a user with respect to at least one of a website or an application associated with a plurality of items as the user interacts with the at least one of the website or the application, the behavior data including at least one of purchasing behavior or browsing behavior;
    determining at least one seed item at least partially based on the behavior data;
    generating a playlist at least partially based on the at least one seed item, the playlist identifying one or more items of the plurality of items;
    transmitting the one or more items of the playlist;
    receiving a request to skip transmission of at least one item of the one or more items of the playlist;
    skipping the transmission of the at least one item without charging a payment for the at least one item; and
    charging payment for the one or more items of the playlist that are transmitted.

2. The method according to claim 1, further comprising:
    receiving tempo curve information from the user, wherein the playlist is further at least partially based on the received tempo curve information.

3. The method according to claim 1, further comprising:
    receiving event type information from the user, wherein the playlist is further at least partially based on the received event type information.

4. The method according to claim 1, further comprising:
    receiving playlist duration information from the user, wherein the playlist is further at least partially based on the received playlist duration information.

5. The method according to claim 1, wherein similarities between items are at least partially based on collective item interests of a community of users of the at least one of the website or the application.

6. The method according to claim 1, further comprising: causing the playlist to be displayed to the user.

7. The method according to claim 1, wherein generating the playlist includes:
    accessing similar content data that identifies the one or more items of the playlist that are similar to a specified item, wherein the playlist is further at least partially based on the similar content data.

8. The method according to claim 1, further comprising:
    receiving a second request to add at least one new item to the playlist; and
    editing the playlist in response to the request by adding the at least one new item into the playlist while at least one of the one or more items of the playlist is being played.

9. The method according to claim 1, further comprising:
    receiving a second request to edit the playlist during transmitting the one or more items of the playlist;
    editing the playlist in response to the request; and
    continuing to transmit the one or more items of the edited playlist.

10. The method according to claim 1, wherein charging payment for the one or more items of the playlist includes:
    charging the user for each of the one or more items of the playlist that are transmitted.

11. The method according to claim 1, wherein generating the playlist occurs in response to the user interacting with the at least one of the website or the application, without the user requesting that the playlist be generated.

12. The method according to claim 1, further comprising:
    arranging an order of the one or more items of the playlist based at least in part on a tempo curve.

13. The method according to claim 1, wherein each of the one or more items of the playlist comprises a song, the method further comprising:
    receiving from the user a second request to purchase one or more songs on the playlist;
    receiving payment information for the purchase; and
    transferring the one or more songs to the user.

14. The method according to claim 1, wherein each of the one or more items of the playlist comprises a song, and the method further comprising:
    determining which songs are not already possessed by the user; and
    reporting to the user the songs that are not already possessed by the user.

15. A system for providing an identification of items of content, comprising:
    a processor; and
    a memory device including instructions that, when executed by the processor, cause the processor to:
        store behavior data of a user with respect to at least one of a website or an application associated with a plurality of items as the user interacts with the at least one of the website or the application, the behavior data including at least one of purchasing behavior or browsing behavior;

determine at least one seed item at least partially based on the behavior data;

generate a playlist at least partially based on the at least one seed item, the playlist identifying one or more items of the plurality of items;

transmit the one or more items of the playlist;

receive a request to skip transmission of at least one item of the one or more items of the playlist;

skip transmission of the at least one item without charging a payment for the at least one item; and charge payment for the one or more items of the playlist that are transmitted.

16. The system of claim 15, wherein the instructions when executed by the processor further cause the processor to:

receive tempo curve information from the user, wherein the playlist is further at least partially based on the received tempo curve information.

17. The system of claim 15, wherein the instructions when executed by the processor further cause the processor to:

receive event type information from the user, wherein the playlist is further at least partially based on the received event type information.

18. The system of claim 15, wherein the instructions when executed by the processor further cause the processor to:

receive playlist duration information from the user, wherein the playlist is further at least partially based on the received playlist duration information.

19. The system of claim 15, wherein similarities between items are at least partially based on collective item interests of a community of users of the at least one of the website or the application.

20. The system of claim 15, wherein the instructions when executed to cause the processor to generate the playlist include causing the processor to:

access similar content data that identifies the one or more items of the playlist that are similar to a specified item, wherein the playlist is further at least partially based on the similar content data.

21. The system of claim 15, wherein the instructions when executed by the processor further cause the processor to:

receive a second request to edit the playlist during transmitting the one or more items of the playlist;

edit the playlist in response to the request; and continue to transmit the one or more items of the edited playlist.

22. The system of claim 15, wherein the instructions when executed to cause the processor to charge payment for the one or more items of the playlist include causing the processor to:

charge the user for each of the one or more items that are transmitted.

23. A non-transitory computer readable storage medium storing instructions for providing an identification of items of content, the instructions when executed by a processor causing the processor to:

store behavior data of a user with respect to at least one of a website or an application associated with a plurality of items as the user interacts with the at least one of the website or the application, the behavior data including at least one of purchasing behavior or browsing behavior;

determine at least one seed item at least partially based on the behavior data of the user;

generate a playlist at least partially based on the at least one seed item, the playlist identifying one or more items of the plurality of items;

transmit the one or more items of the playlist;

receive a request to skip transmission of at least one item of the one or more items of the playlist;

skip the transmission of the at least one item without charging a payment for the at least one item; and charge payment for the one or more items of the playlist that are transmitted.

24. The non-transitory computer readable storage medium of claim 23, wherein the instructions when executed by the processor further cause the processor to:

receive tempo curve information from the user, wherein the playlist is further at least partially based on the received tempo curve information.

25. The non-transitory computer readable storage medium of claim 23, wherein the instructions when executed by the processor further cause the processor to:

receive event type information from the user, wherein the playlist is further at least partially based on the received event type information.

26. The non-transitory computer readable storage medium of claim 23, wherein the instructions when executed by the processor further cause the processor to:

receive playlist duration information from the user, wherein the playlist is further at least partially based on the received playlist duration information.

27. The non-transitory computer readable storage medium of claim 23, wherein similarities between items are at least partially based on collective item interests of a community of users of the at least one of the website or the application.

28. The non-transitory computer readable storage medium of claim 23, wherein the instructions when executed to cause the processor to generate the playlist include causing the processor to:

access similar content data that identifies the one or more items of the playlist that are similar to a specified item, wherein the playlist is further at least partially based on the similar content data.

29. The non-transitory computer readable storage medium of claim 23, wherein the instructions when executed by the processor further cause the processor to:

receive a second request to edit the playlist during transmitting the one or more items of the playlist;

edit the playlist in response to the request; and continue to transmit the one or more items of the edited playlist.

30. The non-transitory computer readable storage medium of claim 23, wherein the instructions when executed to cause the processor to charge payment for the one or more items of the playlist include causing the processor to:

charge the user for each of the one or more items of the playlist that are transmitted.

* * * * *